United States Patent [19]

Fritz et al.

[11] Patent Number: 5,005,803
[45] Date of Patent: Apr. 9, 1991

[54] HIGH RESPONSE, COMPACT SOLENOID TWO-WAY VALVE

[75] Inventors: Frank M. Fritz, Milwaukee; Dale A. Knutson, Nashotah; James P. Janecke, Waukesha, all of Wis.

[73] Assignee: Applied Power Inc., Butler, Wis.

[21] Appl. No.: 290,374

[22] Filed: Dec. 29, 1988

[51] Int. Cl.⁵ .............................................. F16K 31/06
[52] U.S. Cl. ...................... 251/129.15; 251/129.21; 251/333; 251/129.05
[58] Field of Search ................ 251/129.15, 129.21, 251/333, 129.05

[56] References Cited

U.S. PATENT DOCUMENTS

| 881,060 | 3/1908 | Cook . |
| 2,297,535 | 9/1942 | Bryant . |
| 2,927,737 | 3/1960 | Zeuch et al. . |
| 4,368,755 | 1/1983 | King . |
| 4,589,528 | 5/1986 | Axthammer et al. . |
| 4,610,424 | 9/1986 | Koppers et al. . |
| 4,774,976 | 10/1988 | Janecke et al. . |
| 4,785,920 | 11/1988 | Knecht et al. . |
| 4,796,855 | 1/1989 | Sofianek ............. 251/129.21 X |

FOREIGN PATENT DOCUMENTS

| 1242945 | 6/1967 | Fed. Rep. of Germany . |
| 58-112820 | 7/1983 | Japan . |
| 61-197832 | 9/1986 | Japan . |
| 880369 | 10/1961 | United Kingdom ......... 251/129.21 |
| 2190461 | 7/1987 | United Kingdom . |

Primary Examiner—Arnold Rosenthal
Attorney, Agent, or Firm—Quarles & Brady

[57] ABSTRACT

A compact, high response regulating valve has a solenoid modulated armature and plunger construction. The solenoid assembly and armature minimize magnetic flux leakage by maintaining the armature in close proximity to the induced magnetic field. In one embodiment, the lightweight armature has a number of holes to increase the speed at which it may be modulated. Mounted to the armature is a regulator plunger which controls fluid communication between the valve's inlet and outlet ports. Normally spring-biased closed, the plunger uses a line seal to maximize flow with minimal longitudinal plunger movement. Plunger response time is enhanced by eliminating elastomeric friction (i.e., eliminating O-rings and replacing them with a number of notches about the plunger periphery). A conical seat and bevelled plunger provide an effective line seal.

16 Claims, 4 Drawing Sheets

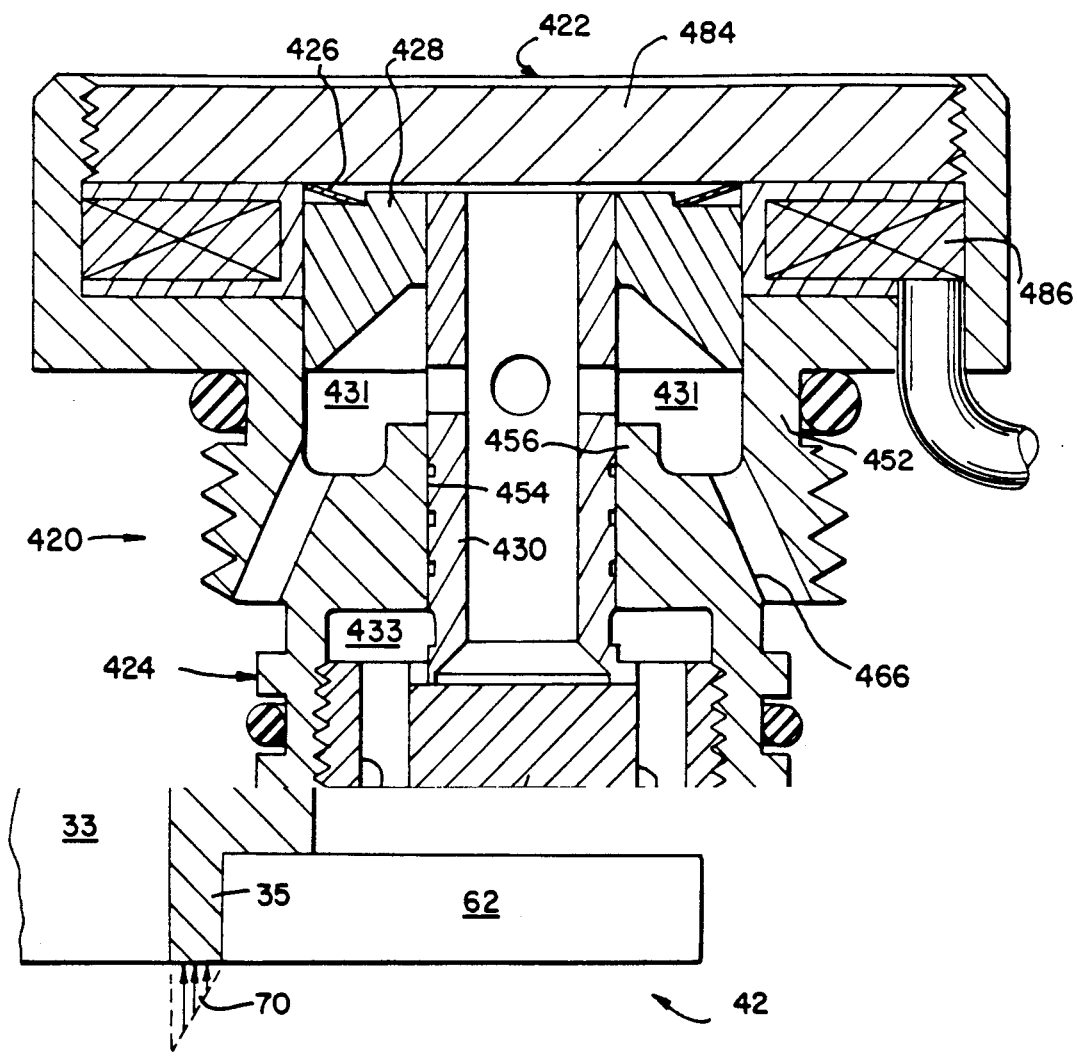

HIGH RESPONSE, COMPACT SOLENOID TWO-WAY VALVE

CROSS REFERENCE TO RELATED APPLICATION, IF ANY:

None

BACKGROUND OF THE INVENTION

1. Field of the Invention

The present invention relates generally to the art of hydraulic control valves and applications therefor having severe space limitations. More specifically, the present invention relates to an improved hydraulic modulator control valve, used in connection with a device requiring a regulated flow of hydraulic fluid wherein the valve configuration has been significantly reduced in size to permit utilization in smaller mechanisms.

2. Description of Related Areas of Art

While no configuration either identical to this valve or designed to accomplish the same objects of this valve are known to the applicant, several devices are known which illustrate the principal operational characteristics of the device. U.S. Pat. No. 4,774,976 issued on Oct. 4, 1988, entitled "Modulating Hydraulic Pressure Control Valve And Assembly Method Therefor", and owned by Applied Power Inc. of Butler, Wis., illustrates a control valve which operates in generally the same manner as the present invention insofar as fluid flow is regulated by an armature which is magnetically controlled by an electric coil. This configuration, however, is inapplicable to many constructions because minimum valve size is limited by the various necessary elements disclosed therein.

OBJECTS AND SUMMARY OF THE INVENTION

It is a primary object of the present invention to provide a flow regulating valve that is extremely compact in size.

It is another important object of the present invention to provide a flow regulating valve that operates with very fast response times.

It is still another object of the present invention to provide a flow regulating valve which, in one embodiment, can operate to alter the damping of vehicle suspension systems.

How these and further objects of the invention are accomplished will be described by reference to the following description of the preferred embodiment of the invention taken in conjunction with the FIGURES. Generally, however, the objects are accomplished in a flow regulating valve having a solenoid modulated armature and plunger construction. The solenoid assembly and armature minimize magnetic flux leakage by maintaining the armature in close proximity to the induced magnetic field. In some cases, the lightweight armature has a number of holes to increase the speed at which it may be modulated. Mounted to the armature is a regulator plunger which controls fluid communication between the valve's inlet and outlet ports. Normally spring-biased closed, the plunger uses a line seal to maximize flow with minimal longitudinal plunger movement. Plunger response time is enhanced by eliminating elastomeric friction (i.e. eliminating O-rings and replacing them with a number of notches about the plunger periphery). In some embodiments, a ledged valve seat utilizes ambient high pressure around the ring valve to ensure sealing of the valve whenever the valve is not energized. Pressure is applied to a ledge above and radially outward of the disc valve ring to counter a naturally occurring upward force on the valve.

Other variations and modifications, as well as different applications of the invention will become apparent to those skilled in the art after reading the specification and are deemed to fall within the scope of the present invention if they fall within the scope of the claims which follow the description of the preferred embodiments.

DESCRIPTION OF THE DRAWINGS

FIG. 3 is an exploded view of the seating construction of the valve of FIG. 1.

FIG. 4 is a cross-sectional view of a second alternate embodiment of the valve of the present invention.

In the FIGURES, like reference numerals are used to indicate like components.

DETAILED DESCRIPTION OF THE PREFERRED EMBODIMENTS

First Alternate Configuration

Figure 1:
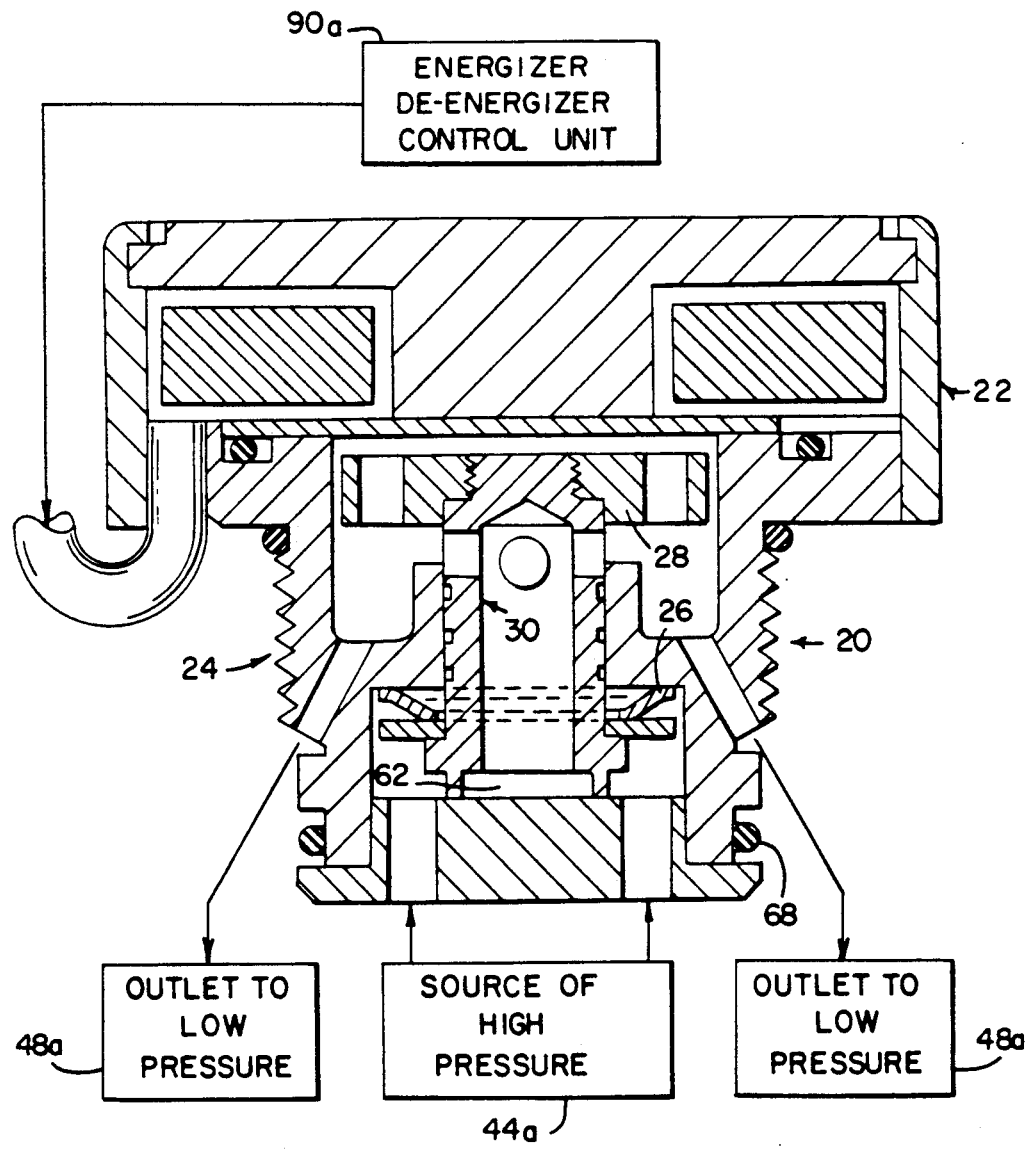
FIG. 1 is a cross-sectional view of a first alternate configuration of the valve of the present invention.

Referring now to FIG. 1, a compact hydraulic flow control valve 20 according to one embodiment of the present invention is shown. It consists of a solenoid assembly 22 and a body member 24. Body 24 includes a valving mechanism that is constructed of a wave spring 26, a disc armature 28 and a regulating plunger 30. FIG. 1 schematically illustrates that energization and de-energization of the solenoid assembly 22 is controlled by control unit 90a. Also, valve 20 uses a source of high pressure 44a at its inlet and an outlet to low pressure 48a as well.

Figure 2B:
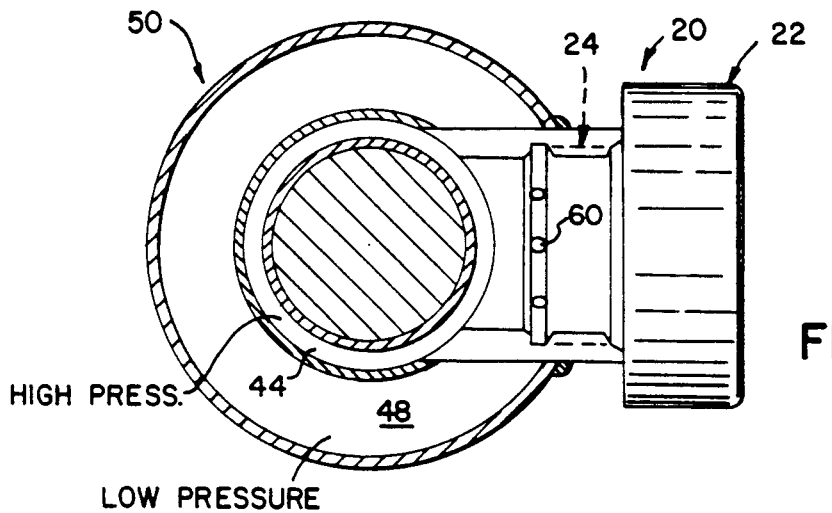
FIG. 2B is a top view of the valve and shock absorber of FIG. 2A.
Figure 2A:
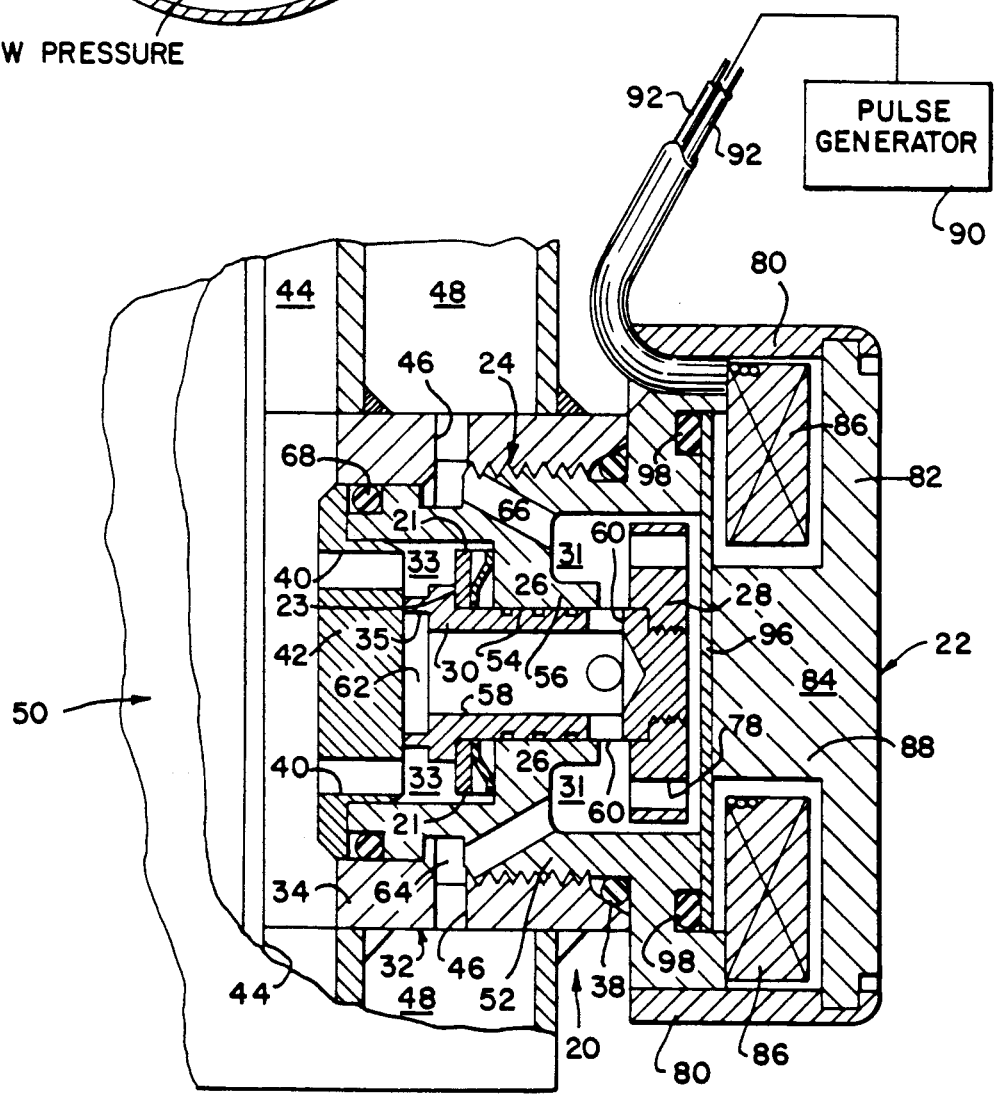
FIG. 2A is a side cross-sectional view of the valve of FIG. 1 incorporated in a vehicle shock absorber.

In FIGS. 2A and 2B, valve 20 is shown mounted to a device such as a vehicle shock absorber 50 having low and high pressure cavities, the flow between which is to be regulated. Generally, there is a mounting 32 having a main body 34. Valve 20 may be screwed into mounting 32 or attached in any other suitable manner. Valve 20 is sealed into mounting 32 with an O-ring 38. End cap 42 has inlet ports 40 which are designed to deliver fluid from the high pressure cavity 44. Outlet ports 46 are located in mounting 32.

The main body 52 of member 24 is generally cylindrical and has a central coaxial bore 54 extending between solenoid assembly 22 and end cap 42. Bore 54 has a central land 56 which, along with plunger 30, defines an upper chamber 31 and a lower chamber 33. Upper chamber 31 is connected to annular space 64 by channels 66. When valve 20 is mounted as shown in FIGS. 2A and 2B, fluid may freely flow from upper chamber 31 via channels 66 to space 64 and on through outlet port 46 in mounting 32 to the low pressure cavity 48.

Undesired fluid leakage between high pressure 44 and low pressure 48 is prevented by O-ring 68. Therefore, the only path for fluid flow between cavities 44 and 48 is from lower chamber 33 to upper chamber 31 via plunger 30. Plunger 30 has a central coaxial bore 58 leading to upper cross-bores 60 which are in fluid communication with upper chamber 31. Beneath bore 58, and defined by plunger ring 35, is a cylindrical space 62.

Disc armature 28 and plunger 30 operate as a single unit, moving between an upper open position, and a lower closed position shown in FIG. 2A. Wave spring 26 normally biases the plunger 30 to its closed position. When the plunger 30 opens, fluid under pressure flows from chamber 33 to space 62 in a radially inward path, then up through plunger 30 to chamber 31.

Movement of plunger 30 is controlled by energization and de-energization of solenoid assembly 22 which creates a magnetic field that pulls armature 28 up toward solenoid 22 against the bias force of spring 28 applied to ledge 23 of plunger 30 by washer 21.

Solenoid assembly 22 is mounted above member 24. Assembly 22 consists of a cap 84 having an upper disc-shaped section 82 held in place directly by the upper portion 80 of body 52. The lower section 88 of cap 84 is cylindrical and has a coil 86 surrounding it. In FIG. 2A, coil 86 is connected by leads 92 to a pulse generator 90 designed to alternately energize and de-energize coil 86.

Upper portion 80 of body 52 and cap 84 hold coil 86 in place along with plate 96. Plate 96 and O-ring 98 seal and protect solenoid assembly 22 from pressurized fluid in upper chamber 31.

Second Alternate Configuration

Another alternate configuration of the present invention is shown in FIG. 4. The valve 420 still includes a solenoid assembly 422, a body member 424, an armature 428, a wave spring 426 and a regulating plunger 430. Fluid is admitted through ports 440 in end cap 442. Main body 452 has a central bore 454 and a land 456 defining upper chamber 431 and lower chamber 433. Channels 466 permit fluid to exit valve 420 from upper chamber 431.

Similar to the configuration of FIG. 2A, the device of FIG. 4 permits fluid flow when plunger 430 is in its upper open position. The ledge structure detailed in FIG. 3 is incorporated in the structure of FIG. 4. Armature 428 now occupies approximately the same position occupied by lower cap section 88 of FIG. 2A. Consequently, coil 486 generally surrounds armature 428, thereby still effectively utilizing the magnetic field generated by coil 486, while further reducing the valve's size.

Additionally, spring 426 is located between cap 484 and armature 428. Despite this different position, spring 426 functions essentially the same way as spring 26 to bias plunger 430 downward. The overall operation of the configuration of FIG. 4 is similar to that of the device in FIG. 2A. The objects of the invention and any other advantages and improvements are readily accomplished by either configuration.

Preferred Configuration

Figure 5:
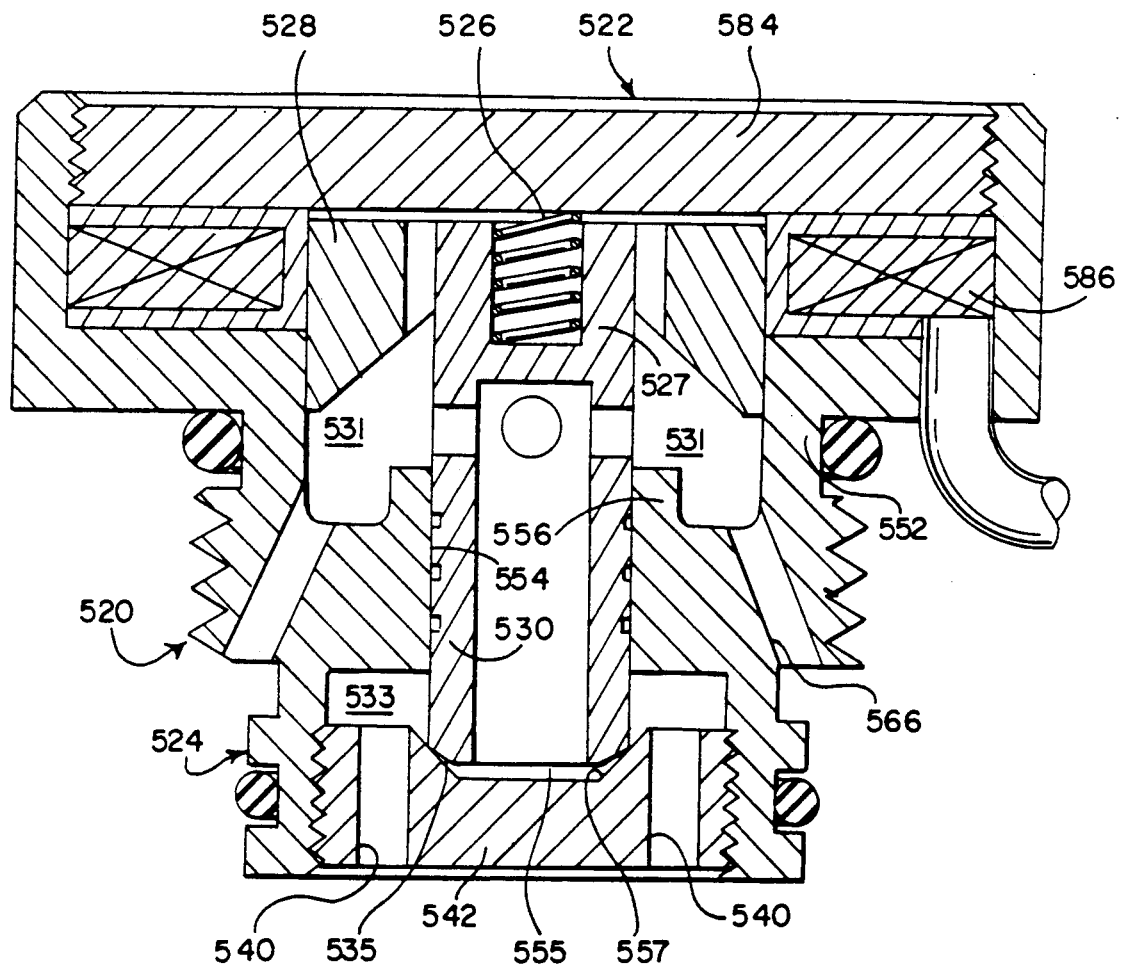
FIG. 5 is a cross-sectional view of the most preferred embodiment of the valve of the present invention.

FIG. 5 illustrates the most preferred embodiment of the present invention. The solenoid assembly 522 and body member 524 are basically the same as the solenoid assembly 422 and body member 424 of the valve configuration of FIG. 4. However, the seating arrangement, armature structure and biasing mechanism are different.

End cap 542 has inlet ports 540 passing through it to a lower chamber 533 defined by land 556 and plunger 530. However, end cap 542 now has a frusto-conical indentation 555 with side wall 557 having an inclination of 45° to horizontal in the preferred embodiment.

The lower portion of plunger 530 is designed to be accommodated by indentation 555. The lower end of plunger 530 has a bevelled lip 535 forming an angle of 30° with the horizontal. When plunger 530 is seated, a line seal is formed with the side wall 557. When plunger 530 is in its upper position in bore 554, fluid flows from lower chamber 533 to upper chamber 531.

Several advantages are realized with this seating configuration. The machining needed is extremely simple and inexpensive compared to other constructions. The line seal is also less contamination sensitive and less sensitive to viscosity changes, fluid flow forces and turbulence. The conical seating arrangement provides guided seating for repetitive operation. Finally, because the sealing diameter and seating diameter are the same, the unseating problem addressed above is not present.

Plunger 530 is biased downward by a spring 526 which is now located in an upper section 527 of plunger 530. This construction improves the magnetic performance characteristics of the armature 528 because the outer annular space formerly occupied by springs is now used to enhance the magnetic flux induced by coil 586. Armature 528 has several holes 578 for fluid flow between cap 584 and upper chamber 531.

OPERATION

In the following discussion, it should be kept in mind that the configurations of FIGS. 4 and 5 operate in substantially the same manner as the configuration whose operation is now explained with respect to FIGS. 1, 2A, 2B and 3. Where material operational differences do exist, appropriate note will be made. For purposes of this explanation, it will be assumed that the valve is used to alter or otherwise control the damping characteristics of a shock absorber 50 having a high pressure cavity 44, and a low pressure cavity 48 designed to accept fluid during compression. FIGS. 2A and 2B show such a mounting configuration.

Normally, plunger 30 is biased closed, i.e. plunger ring 35 is in sealing contact with end cap 42, thereby preventing fluid flow from cavity 44 to cavity 48. Likewise, in FIG. 5, the line seal between plunger 530 and side wall 557 is in place. If solenoid assembly 22 remains de-energized during compression of the shock absorber 50, the damping characteristics of shock absorber 50 are maintained without alteration. To ensure there is no seepage of pressurized fluid under plunger ring 35, a special structure shown in detail in FIG. 3 is used.

As seen in FIG. 3, in some embodiments, the outer edge of ring 35 is radially outside the outer surface 73 of plunger 30. This radial difference is represented in FIG. 3 by arrow 74. The high pressure in lower chamber 33 induces a certain amount of pressure downwardly on ledge 23, as depicted by arrows 72. This downward pressure on ledge 23 is specifically designed to counter the aggregate force existing between ring 35 and cap 42 as a result of the pressure difference between chamber 33 and space 62 (in which the pressure tends to approximate 0 psi). The aggregate resulting upward pressure is represented by arrows 70 in FIG. 3.

Thus, applicant has utilized the high pressure in chamber 33 which can cause unseating of the plunger 30 if the resulting upward pressure 70 is greater than the biasing force of wave spring 26, and has created an additional downward biasing force 72 so that plunger 30 remains down unless the solenoid 22 is energized.

The bottom ring configuration 35 of plunger 30 and the seating arrangement of FIG. 5 permit the greatest fluid flow possible with the least vertical movement of armature 28. In this way, a large flow of pressurized fluid (to decrease damping of shock absorber 50) is achieved while minimizing the space and response time needed in valve 20 for armature 28 and plunger 30 to open.

When the damping of shock absorber 50 is to be decreased, solenoid assembly 22 is modulated to allow fluid flow in a predetermined fashion. The coil 86 and other elements of solenoid assembly 22 create an improved magnetic circuit. The coil shape and its proximity to armature 28 yield a greater motive force with less current than earlier devices. There is also considerably less magnetic flux leakage than in earlier devices. This is important because one of the primary objects of this valve is to achieve the fastest response time possible between solenoid energization and armature/plunger movement.

Armature 28 is also specially designed to accomplish maximum efficiency and fast response times. One or more holes 78 are drilled through armature 28 for several reasons. First, holes 78 reduce any suction or adhesion impeding or delaying movement of armature 28 away from plate 96 when solenoid 22 is de-energized. Further, holes 78 reduce the weight of armature 28, and therefore momentum and inertia, to increase response time. Finally, holes 78 provide additional flow paths for fluid being displaced during movement of armature 28 in either direction.

Plunger 30 (with ring 35 or side wall 557) and armature 28 (in conjunction with solenoid 22) are therefore designed with two goals in mind—minimize the size of the valve while enhancing the response time. Response time is improved by one other feature. A number of notches 76 surround the surface 73 of plunger 30 as shown in FIG. 3. Notches 76 provide hydraulic balancing forces to keep plunger 30 centered in bore 54. Without these balancing forces, hydraulic forces would push plunger 30 horizontally against the wall of bore 54, thereby holding plunger 30 statically in bore 54. While some minimal leakage can occur, it is insignificant with respect to the valve's efficient operation.

When solenoid 22 is modulated, a controlled flow travel path for pressurized fluid is provided. Armature 28 is magnetically reciprocated, moving plunger 30 between its open and closed positions rapidly. This movement is rapid and covers only a very short distance; but the disc valve and annular opening configuration of ring 35 and cap 42 and the conical side wall 557 and bevelled plunger lip 535 mean that appreciable flow rates can nevertheless be achieved. Modulation of solenoid 22 can be controlled by a variety of devices—a microprocessor, analog controls, and others.

Other variations, modifications and applications will become apparent to those skilled in the art. In particular, a number of other applications of the valve are possible. Any device or system having size restrictions and requiring high response characteristics in a regulating valve would benefit from incorporating the valve. Therefore, the above description of the preferred embodiments is to be viewed as illustrative rather than limiting. The scope of the present invention is limited only by the scope of the claims that follow.

What is claimed is:

1. A high response, compact, flow regulating valve comprising:
    a housing having a generally cylindrical bore extending therethrough, said housing having an inlet port and an outlet port connected by said bore of said housing, said housing further having a first land in said bore, said first land defining a first chamber above said land and a second chamber below said land;
    means for regulating fluid communication between said inlet port and said outlet port, said regulating means movable between a first closed position and a second open position, including:
    a generally cylindrical plunger, longitudinally slidable within said bore of said housing, having a coaxial bore therethrough, at least one cross bore connecting said bore of said plunger to said first chamber, and a plurality of notches about the periphery of said plunger;
    sealing means at the base of said plunger including an outer bevelled lower edge on said plunger and a frusto-conical indentation in said housing below and concentric to said bevelled edge, said indentation designed to accept said bevelled edge to prevent fluid communication between said first and second chambers when said plunger is in contact with said indentation;
    means for biasing said plunger into contact with said indentation;
    a lightweight armature mounted to the upper end of said plunger and movable within said first chamber;
    solenoid means comprising a coil which, when energized, magnetically moves said plunger away from said indentation; and
    means for selectively energizing and de-energizing said coil.

2. A high response, compact, flow regulating valve comprising:
    a housing having a generally cylindrical bore extending coaxially therethrough, said housing having an inlet port and an outlet port connected by said bore of said housing, said housing further having a first land in said bore, said first land defining a first chamber above said land and a second chamber below said land;
    means for regulating fluid communication between said inlet port and said outlet port, said regulating means movable between a first closed position and a second open position, including:
    a generally cylindrical plunger, longitudinally slidable within said bore of said housing, having a coaxial bore therethrough, at least one cross bore connecting said bore of said plunger to said first chamber, and a plurality of notches about the periphery of said plunger;
    sealing means at the base of said plunger and concentric therewith, wherein when said regulating means is in said first position, said sealing means forms a line seal with said housing and prevents fluid from flowing to said outlet port from said inlet port;
    means for biasing said regulating means to said first position;
    a lightweight armature being mounted to the upper end of said plunger and movable within said first chamber; and
    solenoid means comprising a coil which, when energized, magnetically moves said regulating means to said second open position; and
    means for selectively energizing and de-energizing said coil.

3. The valve of claim 2 wherein said means for selectively energizing and de-energizing said coil is an electric pulse generator operated by a control unit.

4. The valve of claim 3 wherein said control unit is a microprocessor.

5. The valve of claim 3 wherein said control unit is an analog electrical device.

6. The valve of claim 3 wherein said control unit is an on/off switch.

7. The valve of claim 3 wherein said biasing means further comprises a spring within said plunger urging said plunger downward.

8. A high response, compact, flow regulating valve, comprising:
   a housing having a generally cylindrical bore extending coaxially therethrough, said housing having an inlet port and an outlet port connected by said bore of said housing, said housing further having a first land in said bore, said first land defining a first chamber above said land and a second chamber below said land;
   a generally cylindrical plunger, longitudinally slidable within said bore of said housing, said plunger movable between a first closed position and a second open position to regulate fluid communication between said inlet port and said outlet port, said plunger having:
      an upper end with a recessed portion therein;
      a lower end opposite said upper end, said lower end forming a line seal with said housing when said plunger is in said first position to prevent fluid from flowing to said outlet port from said inlet port;
      a coaxial bore open at said lower end of said plunger;
      at least one cross bore connecting said coaxial bore of said plunger to said first chamber; and
      a plurality of notches about the periphery of said plunger;
   means for biasing said plunger to said first position, said biasing means mounted in said recessed portion of said upper end of said plunger;
   a lightweight armature being mounted to the upper end of said plunger and movable within said first chamber;
   solenoid means surrounding said armature, said solenoid means including a coil which, when energized, magnetically moves said plunger to said second open position; and
   means for selectively energizing and de-energizing said coil.

9. The valve of claim 8, wherein said means for selectively energizing and de-energizing said coil is an electric pulse generator operated by a control unit.

10. The valve of claim 9, wherein said control unit is a microprocessor.

11. The valve of claim 9, wherein said control unit is an analog electrical device.

12. The valve of claim 9, wherein said control unit is an on/off switch.

13. The valve of claim 8, wherein said armature includes at least one hole passing longitudinally therethrough.

14. The valve of claim 13, wherein:
said lower end of said plunger includes an outer bevelled edge; and
said housing includes a frusto-conical indentation below and concentric to said bevelled edge, said frusto-conical indentation being designed to accept said bevelled edge to form the line seal and prevent fluid communication between said first and second chambers when said plunger is in said first position.

15. A high response, compact, flow regulating valve, comprising:
   a housing having:
      a generally cylindrical bore extending coaxially therethrough;
      a first land in said bore, said first land defining a first chamber above said land and a second chamber below said land; and
      an outlet port in communication with said first chamber;
   a lower end cap attached to said housing, said lower end cap having inlet ports which are in communication with said second chamber;
   a generally cylindrical plunger, longitudinally slidable within said bore of said housing, said plunger movable between a first closed position and a second open position to regulate fluid communication between said inlet port and said outlet port, said plunger having:
      an upper end with a recessed portion therein;
      a lower end opposite said upper end, said lower end forming a line seal with said lower end cap when said plunger is in said first position to prevent fluid from flowing to said outlet port from said inlet port;
      a coaxial bore open at said lower end of said plunger;
      at least one cross bore connecting said coaxial bore of said plunger to said first chamber; and
      a plurality of notches about the periphery of said plunger;
   means for biasing said plunger to said first position, said biasing means mounted in said recessed portion of said upper end of said plunger;
   a lightweight armature mounted to the upper end of said plunger and movable within said first chamber, said armature having at least one longitudinal hole forming a flow path for fluid displaced during movement of said armature;
   solenoid means surrounding said armature, said solenoid means including a coil which, when energized, magnetically moves said plunger to said second open position;
   an upper end cap attached to said housing, said upper end cap retaining said solenoid means within said housing; and
   means for selectively energizing and de-energizing said coil.

16. The valve of claim 15, wherein:
said lower end of said plunger includes an outer bevelled edge; and
said lower end cap includes a frusto-conical indentation below and concentric to said bevelled edge, said frusto-conical indentation being designed to accept said bevelled edge to form the line seal and prevent fluid communication between said first and second chambers when said plunger is in said first position.

* * * * *